United States Patent
Pachet et al.

(10) Patent No.: US 7,130,860 B2
(45) Date of Patent: Oct. 31, 2006

(54) METHOD AND SYSTEM FOR GENERATING SEQUENCING INFORMATION REPRESENTING A SEQUENCE OF ITEMS SELECTED IN A DATABASE

(75) Inventors: Francois Pachet, Paris (FR); Daniel Cazaly, Paris (FR); Pierre Roy, Paris (FR)

(73) Assignee: SONY France S.A., Clichy (FR)

( * ) Notice: Subject to any disclaimer, the term of this patent is extended or adjusted under 35 U.S.C. 154(b) by 204 days.

(21) Appl. No.: 09/965,031

(22) Filed: Sep. 27, 2001

(65) Prior Publication Data

US 2002/0083055 A1     Jun. 27, 2002

(30) Foreign Application Priority Data

Sep. 29, 2000   (EP)   ................................. 00 402 692

(51) Int. Cl.
G06F 17/30 (2006.01)
(52) U.S. Cl. ............................. 707/102; 707/101; 707/3
(58) Field of Classification Search .................... 707/2, 707/3, 5, 6, 101, 102; 705/26, 10; 725/46
See application file for complete search history.

(56) References Cited

U.S. PATENT DOCUMENTS

| | | | | |
|---|---|---|---|---|
| 5,616,876 A | * | 4/1997 | Cluts ............................. | 84/609 |
| 5,850,229 A | * | 12/1998 | Edelsbrunner et al. ....... | 345/473 |
| 5,925,843 A | * | 7/1999 | Miller et al. .................... | 84/609 |
| 5,969,283 A | * | 10/1999 | Looney et al. ................. | 84/609 |
| 6,223,210 B1 | * | 4/2001 | Hickey ........................ | 709/203 |
| 6,266,649 B1 | * | 7/2001 | Linden et al. ................ | 705/26 |
| 6,581,207 B1 | * | 6/2003 | Sumita et al. ................ | 725/46 |
| 6,629,097 B1 | * | 9/2003 | Keith ............................. | 707/5 |
| 6,665,641 B1 | * | 12/2003 | Coorman et al. ........... | 704/260 |
| 6,678,680 B1 | * | 1/2004 | Woo .............................. | 707/6 |
| 6,728,706 B1 | * | 4/2004 | Aggarwal et al. ............. | 707/5 |
| 2002/0082901 A1 | * | 6/2002 | Dunning et al. .............. | 705/10 |
| 2003/0164844 A1 | * | 9/2003 | Kravitz et al. ............. | 345/700 |

FOREIGN PATENT DOCUMENTS

EP      0 961 209      12/1999

OTHER PUBLICATIONS

Pachet F et al: "A Combinatorial Approach to Content-Based Music Selection" Proceedings IEEE International Conference on Multimedia Computing and Systems, Proceedings of ICMCS99: IEEE Multimedia Systems '99: International Conference on Multimedia Computing and Systems, Florence, Italy, Jun. 7-11, 1999, pp. 457-462, vol. 1, XP002165216.

Philippe P: "Low-Level Musical Descriptors for MPEG-7" Signal Processing. Image Communication, Elsevier Science Publishers, Amsterdam, NL, vol. 16, No. 1-2, Sep. 2000, pp. 181-191, XP004216275.

(Continued)

*Primary Examiner*—John Cottingham
*Assistant Examiner*—Kuen S. Lu
(74) *Attorney, Agent, or Firm*—Oblon, Spivak, McClelland, Maier & Neustadt, P.C.

(57) ABSTRACT

A method and a system for generating sequencing information representing a sequence of items selected in a database. Similarity relation techniques are applied between the items.

35 Claims, 2 Drawing Sheets

OTHER PUBLICATIONS

Pachet F et al: "A Combinatorial Approach to Content-Based Music Selection" IEEE Multimedia, Jan.-Mar. 2000, IEEE, USA, vol. 7, No. 1, pp. 44-51, XP002165217.

Rosenfeld P L: "Home (Computer) Terminal Musical Program Selection" IBM Technical Disclosure Bulletin, US, IBM Corp. New York, vol. 23, No. 7B, Dec. 1, 1980, pp. 3440-3441, XP000706866.

\* cited by examiner

FIG. 1

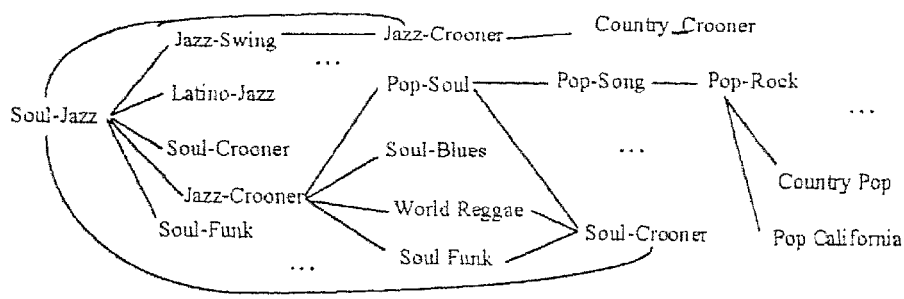

FIG. 2

| 3 | Sunrise | | | | |
|---|---|---|---|---|---|
| | | Atkins Chet | Jazz Calif | 250s | slow fast |
| | | instrumental | Instrumental | jazz guitar | strings |
| 21 | Surrounded | | | | |
| | | Kreviazuk Chant | Pop Calif | 238s | slow fast |
| | | powerful | Woman | piano | strings |
| 6 | Still is still moving to | | | | |
| | | Nelson Willie | Country Calif | 210s | fast |
| | | nasal | Man | calif guitar | calif guitar |
| 9 | Not a moment too soon | | | | |
| | | Mac Graw Tim | Country Calif | 222s | slow fast |
| | | hoarse | Man | calif guitar | piano |
| 10 | Lovin' all night | | | | |
| | | Crowell Rodney | Country Pop | 227s | fast |
| | | normal | Man | calif guitar | brass |
| 11 | Hard way (the) | | | | |
| | | Carpenter Mary | Country Pop | 262s | slow fast |
| | | normal | Woman | calif guitar | piano |
| 17 | Point of rescue (the) | | | | |
| | | Ketchum Hal | Country Calif | 265s | fast |
| | | normal | Man | calif guitar | calif guitar |
| 50 | At seventeen | | | | |
| | | Ian Janis | Pop Folk | 281s | slow fast |
| | | soft | Woman | acoustic guitar | brass |
| 27 | Dream on | | | | |
| | | Labounty Bill | Pop Calif | 298s | slow fast |
| | | broken | Man | keyboard | brass |
| 106 | Another time another plac | | | | |
| | | Steely Dan | Jazz Calif | 245s | fast slow |
| | | instrumental | Instrumental | piano | keyboard |
| 112 | Learn to love you | | | | |
| | | Connick Harry J | Jazz Crooner | 279s | slow fast |
| | | muffled | Man | brass | strings |
| 137 | Heart of my heart | | | | |
| | | Elgart Les | Jazz Swing | 151s | slow fast |
| | | instrumental | Instrumental | double bass | brass |

METHOD AND SYSTEM FOR GENERATING SEQUENCING INFORMATION REPRESENTING A SEQUENCE OF ITEMS SELECTED IN A DATABASE

CROSS REFERENCE TO RELATED APPLICATION

The present application claims priority to and contains related subject matter to that disclosed in EUROPEAN PATENT OFFICE (EPO) Application. No. 00 402 692.8, filed on Sep. 29, 2000.

FIELD OF THE INVENTION

The present invention relates to a system that produces fixed-length sequences of items out of a database, such as music title programmes from a music catalogue. A sequence thus produced has to comply with partial information specified by a user, and to be "continuous" in terms of "morphologies" of the items generated in the sequence. This partial information may be, for example, a first title and a last title in the sequence of items (simple case), or part of "morphological" information on any particular item in the sequence. In the musical field, this information may be a musical descriptor such as genre, a type of rhythm, the tempo, etc. The "continuity" between the items is achieved through a similarity relationship. This relationship is defined as a combination of individual similarity measures described for each possible descriptor value.

BACKGROUND OF THE INVENTION

Advances in networking and transmission of digital multimedia data has provided users with a huge number of information catalogues, such as music catalogues. These advances thus raise not only the problem of distribution, but also the problem of choosing desired information among huge catalogues.

Such new developments raise music selection problems which may depend on the aims of users or content providers. Although modelling a user's goal in accessing music is very complex, two basic elements, i.e. desire of repetition and desire of variation or surprise, can be identified.

The desire of repetition means that people want to listen to music they already know, or similar to what they already know. Sequences of repeating notes create expectations of the same notes to occur. On the other hand, the desire for variation or surprise is a key to understanding music at all levels of perception.

Of course, these two desires are contradictory, and the issue in music selection is precisely to find the right compromise: provide users with items they already know, or items they do not know but would probably like.

From the viewpoint of record companies, the goal of music delivery is to achieve a better exploitation of the catalogue. Indeed, record companies have problems with the exploitation of their catalogues using standard distribution schemes. For technical reasons, only a small part of a catalogue is actually "active", i.e. proposed to users, in the form of easily available products. More importantly, the analysis of music sales shows clearly decreases in the sales of albums, and short-term policies based on selling many copies of a limited number of items (hits) are no longer efficient. Additionally, the sales of general-purpose "samplers" (e.g. "Best of love songs") are no longer profitable, because users already have the hits, and do not want to buy CDs in which they like only a fraction of the titles. Instead of proposing a small number of hits to a large audience, a natural solution is to increase diversity, by proposing more customised albums to users.

In the present invention, the term "database" is used for designating any collection of data, e.g. covering both pre-stored data and dynamically stored data. The term "metabase" is used to describe a database containing descriptors of the items in the database. There are many situations in which it is necessary or desirable to create a sequence of items (e.g. music titles) from a collection of items for which data are available. It is also important that a created sequence is "coherent", i.e. there should exist a particular relationship between descriptors of the items which constitute a sequence. Typically, the descriptors of the items, components of the sequence, should not be too dissimilar, especially for successive items in the same sequence. A typical case where the problem supra arises is in the field of multimedia. A notable problem concerns an automatic generation of music programs, the latter being an example of temporal sequence. Here the term "program" is used not only to designate a sequence of musical pieces, but also, more generally, any temporal sequence of multimedia items, e.g. film clips, documentaries, texts.

A system producing "coherent" sequences of items in a particular order is disclosed in European patent application EP-A-0 961 209.

The items descriptors are stored in a metabase and consist of data pairs respectively consisting of a descriptor and a corresponding value. The problem of creating the desired sequence is treated as a "Constraint Satisfaction Programming (CSP)", also disclosed in the European patent application supra. The sequence to be obtained is specified by formulating a collection of constraints holding on items in the metabase. Each constraint describes a particular property of the sequence, and the sequence can be specified by any number of constraints.

The items in the metabase exhibit a particular generic format with associated taxonomies for at least some of the descriptors. Also, the constraints are specified out of a predetermined library of generic constraint classes which have been specially formulated. The special constraint classes allow the expression of desired properties of the target sequence, notably properties of similarity between groups of items, properties of dissimilarity and properties of cardinality. These constraint classes enable the properties of coherent sequences to be expressed in a particularly simple manner.

It is the combination of the use of a generic format for items in the data base and the special constraint classes which enables the use of a CSP solution technique to solve the combinatorial problem of building an ordered collection of elements satisfying a number of constraints.

OBJECTS AND SUMMARY OF THE INVENTION

It is an object of the present invention to provide a system which enables users to produce a fixed-length sequence of items out of a database by specifying only partial information. The main innovation of the invention is 1) the introduction of a special class of constraint, namely the global continuity constraint which allows to compute a "morphing" between two titles and 2) the possibility of specifying partial information about arbitrary titles in the sequence to be produced.

To this end, there is provided a method of generating sequencing information representing a sequence of items selected in a database, each of the items comprising a set of descriptors. The method comprises the steps of:

a) specifying a length of the sequence and at least one of the descriptors;

b) applying similarity relation techniques between the items; and c) generating a fixed-length sequence having a morphological continuity.

In the above method, each of the items may be represented by a series of constraint variables having a domain in the database.

Further, the above-mentioned similarity-relation applying step may comprise modelling each of the descriptors in a desired sequence as a constrained variable.

Further yet, the similarity-relation applying step may comprise applying a global similarity relation technique by combining individual similarity measures on all of the descriptors.

Typically, the similarity-relation applying step comprises providing mathematical similarity functions.

Suitably, the similarity-relation applying step comprises providing similarity relations defined by given thresholds.

In the above method, the sequence-generating step may comprise transforming the at least one of the values into unary constraints in terms of constraint satisfaction programming techniques.

Suitably, the above sequence-generating step further comprises subjecting the unary constraints to a processing of variables domain reduction.

In the above method, the descriptors are preferably expressed in terms of descriptor/value pairs respectively, and each of the values for the descriptor is selected from descriptor/value lists.

Further, each of the descriptors may be associated to a descriptor type.

Preferably, the above descriptor type comprises at least one type selected from the group consisting of Integer-Type, Taxonomy-Type and Discrete-Type.

In the above-described method, the step of specifying at least one of said values may comprise specifying a first title and a last title of the items in the sequence.

Further, the step of specifying at least one of the values may comprise specifying a morphological style of the items in the sequence.

In a typical case, the above database comprises musical pieces, and the values comprise titles, and the titles form a music program.

The present invention further provides a system adapted to implement one of the above-described methods, which system comprises a general-purpose computer and a monitor for display of the generated information.

The invention also relates to a computer program product adapted to carry out one of the above-mentioned methods, when it is loaded into a general purpose computer.

BRIEF DESCRIPTION OF THE DRAWINGS

The above and other objects, features and advantages of the present invention will be made apparent from the following description of the preferred embodiments, given as non-limiting examples, with reference to the accompanying drawings, in which:

FIG. 1 illustrates a taxonomy of musical styles, in which links indicate a similarity relation between styles. Here, "Jazz-Crooner" is represented as similar to "Soul-Blues";

FIG. 2 illustrates an example of music programs defined by descriptors;

Figure 3:
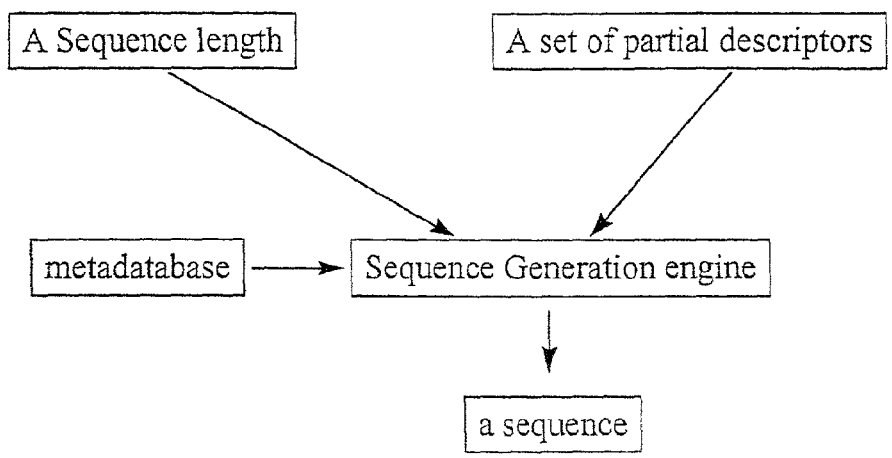
FIG. 3 shows the general data flow according to the concept of the present invention.

In the preferred embodiments, the invention is applied to the automatic composition of musical programmes, for example for radio, set-top boxes, etc.

DETAILED DESCRIPTION OF THE INVENTION

The description of the preferred embodiments of the invention will begin with an explanation of the constitutive elements, on the basis of which the present invention is implemented.

The present invention therefore uses constraint satisfaction programming techniques already described in European patent application EP-A-0 961 209, whose corresponding part is herewith expressly incorporated by reference in its entirety.

In the technical field of the present invention, and more particularly in the musical field, applications targeted at non professionals have also been developed using "RecitalComposer", an embodiment of the previous patent application. "PathBuilder" is an application in which the user can specify a starting title and an ending title. The system contains hidden constraints on continuity of styles, and tempos are fixed. For instance: find a continuous path between Céline Dion's "All by myself", and Michael Jackson's "Beat it". Another similar application allows users to specify only the stylistic structure of the program. This may be used for instance for creating long programs for parties, in which the structure (e.g. begin with Pop, then Rock, then Slows, etc.) is known in advance.

Such an approach can be used to produce music programs in specific styles, by adding domain specific constraints. Other applications are envisaged for set-top-box services and digital audio broadcasting.

As can be understood from the foregoing, "RecitalComposer" is an enabling technology for building high-level music delivery services. The system is based on the idea of creating explicit sequences of items, specified by their global properties, rather than on computing sets of items satisfying queries. One of its main advantages over other approaches is that it produces ready-for-use music programs which satisfy the goals of music selection: repetition, surprise, and exploitation of catalogues.

EXAMPLES OF THE INVENTION

The present invention is described hereinafter with reference to the sequences containing music titles. The invention relates to a method of specifying or describing some or the entirety of the descriptors of the titles in a sequence, thereby automatically generating distance measuring, and performing so called "morphing" between two or more items, e.g. music titles.

The present invention has the following features:

1) it allows the user to specify partial descriptions of titles (and not only a "specific description", i.e. entirely specified title); and 2) it allows the user to specify descriptions for "arbitrary" titles in the sequence (and not only the first or ending title).

1. Metabase

The invention assumes the existence of a database of metadata, referred to as a metabase. The metabase of items, e.g. music titles, contains content information needed for specifying the constraints.

Each item is described in terms of descriptors which take their value in a predefined taxonomy. The descriptors are of two sorts: technical descriptors (descriptors) and content descriptors (values). Technical descriptors include the name of the title (e.g. name of a song), the name of the author (e.g. singer's name), the duration (e.g. "279 sec"), and the recording label (e.g. "Epic"). Content descriptors describe musical properties of individual titles. The descriptors may be the following: "style" (e.g. "Jazz Crooner"), "type of voice" (e.g. "muffled"), "music setup" (e.g. "instrumental"), "type of instruments" (e.g. "brass"), "tempo" (e.g. "slow-fast"), and other optional descriptors such as the "type of melody" (e.g. "consonant"), or the main "theme" of the lyrics (e.g. "love").

No assumptions are made as regards how the metabase is created. Some of the descriptors may be entered by hand, others extracted automatically, such as the tempo (see e.g. Scheirer, E. D., J. of the Acoustical Society of America, 103 (1), 588–601, 1998), or the rhythm structure (see previous patent application EP 00 401 915.4).

Although the invention is largely independent of the actual structure and content of the metadatabase, an example of such a metadatabase is given hereinafter. Typically, the descriptors include the following:

Title name
Author
Style
Tempo
Energy
VoiceType
MainInstrument
RhythmType

The possible values for each of these descriptors are taken from descriptor-value lists. Each descriptor is associated to a "Descriptor-Type". For instance, the Tempo descriptor is of Integer-Type (its value is an integer). The Style descriptor is of type "Taxonomy-Type". The MainInstrument descriptor is of type "DiscreteDescriptor", i.e. can take its value in a finite set of discrete values.

2. Taxonomies of Values and Similarity Relations

An important aspect of the metabase is that the values of content descriptors are linked to each other by similarity relations. These similarity relations are used for specifying constraints on the continuity of the sequence (e.g., the preceding example contains a constraint on the continuity of styles). More generally, the taxonomies on descriptor values establish links of partial similarity between items, according to a specific dimension of musical content.

For all descriptor types, there is supposed the existence of a similarity relation similarity_X. This relation indicates whether a value for a given descriptor is "similar" to another value. For instance, the Style descriptor takes its value in a taxonomy of styles, in which the similarity relation is explicitly present (e.g. style_value="Disco:US" could be explicitly stated as similar to style_value="Disco:Philadelphia"). Other descriptors can have mathematical similarity functions. For instance, the tempo descriptor ranges over integers, on which similarity relations are defined using thresholds: similar-tempo(a, b) if |b−a|<threshold.

3. Input/Output

The present embodiment of the invention uses, as input:
(1) a sequence length n>1, and
(2) a limited number of descriptors (partial descriptors) for each item of the sequence.

It gives, as output, a sequence of length n, which satisfies a set of conditions defined below.

The "partial descriptors" are of the following form. For each title $t_i$ of the sequence (1<=i<=n, where n is the length of the sequence), any number of descriptors is given a possible value, including "non specified".

Figure 4:
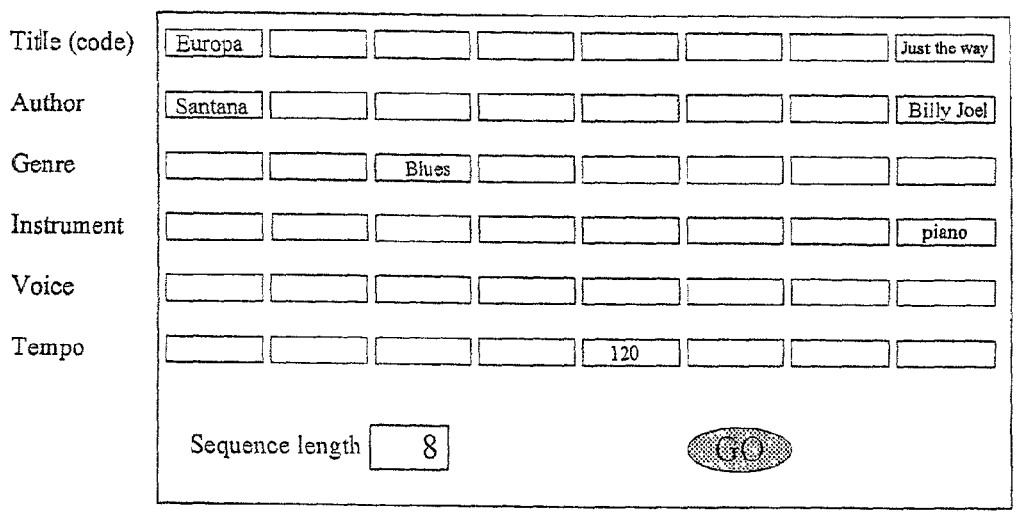
FIG. 4 illustrates an example of a user interface for specifying partial information on the descriptors for a sequence of length 8.

FIG. 4 shows an example of a user interface for specifying this partial information, for a sequence of length 8.

Once specified, the sequence is computed so that two conditions are satisfied:

(i) titles of the sequence satisfy the corresponding partial specifications (when they exist, i.e. when they are different from "non specified");

(ii) titles are linked to each other by a global similarity relation SIM, defined below.

4. Algorithm (A). Similarity Relation

The algorithm uses a global similarity function SIM defined between two music titles. This function is a Boolean function (yields a yes/no answer). The function SIM can be defined in various ways. But in the present invention, all cases are defined from the individual similarity relations on each descriptor's "similarity-X" (see above).

The algorithm of the invention can in principle cope with any function SIM defined from similarity-X relations. In most cases though, the SIM function is defined as a logical combination of individual similarity-X relations. For instance, the SIM function can be defined as follows:

(B). Definition of the SIM Function

The number of descriptors of $t_1$ which are similar to the corresponding descriptors of $t_2$ is less than 1.

In pseudo-code:
SIM ($t_1$, $t_2$)=
CPT=0;
FOR I=1 to Max-Descriptor
   if Similarity-$_i$($t_1$, $t_2$)=false, then CPT:=CPT+1;
end FOR
return CPT<=1

(C). Description of the Algorithm (1). General Aspect

The invention makes use of a constraint solver system, as in previous patent application EP 0 961 209.

The sequence generation problem is represented as a constraint satisfaction problem:

the constrained variables are each title of the sequence $t_i$.

The domain of these variables is a database of titles.

the constraints are the following:

i) Each "partial" specification given by the user is transformed into unary constraints, which are themselves transformed into variable domain reduction in a straightforward fashion. For instance, if the user wants the style of the third title to be "Jazz", then only items satisfying this constraint will be retained in the domain of $t_3$.

ii) The global similarity relation SIM is represented as a binary constraint established systematically between all pairs of contiguous title variables (i.e. between $t_i$ and $t_{i+1}$, for i=1 to n−1).

A constraint satisfaction algorithm is applied using an arc-consistency technique for the similarity constraints, defined as follows:

The main specific aspect of this algorithm is the implementation of the filtering procedure for the binary SIM constraint. This constraint is implemented as follows.

(2) Description of the Similarity Constraint (i) Notations

We present here the set of notations used in this section of the document.

The symbol ~ represents the similarity between descriptor values in their respective taxonomies We use uppercase for variables, e.g. X, Y We use lowercase for values, e.g. x, y Dom(X) denotes the domain of variable X C(X, Y) denotes a constraint involving two constrained variables X and Y Constraint C(X, Y) is defined by a formula of satisfaction (intentional definition), e.g. if C(X, Y) is an equality constraint, it will be defined by:

$$C(X,Y)(x,y)=1 \text{ iff } x=y$$

We systematically identify 1 with True and 0 with False (ii) Preliminary

In our approach, we implement similarity constraints by means of simpler constraints: counting and descriptor constraints. Counting constraints are used to evaluate the number of differences between the descriptor values of two titles. Descriptor constraints are used, in conjunction with descriptor variables, to represent descriptor values of titles as constrained variables. This is necessary to enable the definition of constraints over the descriptors themselves.

(a) Counting Constraints: $CNT_R(X, Y, B)$

Given two constrained variables X and Y, given B a 0/1-constrained variable, and given a relation R defined over Dom(X)×Dom(X)—the Cartesian product of the domains of X and Y, we define the constraint $CNT_R(X, Y, B)$ (CNT stands for Counting constraint) by:

$CNT_R(X, Y, B)$ (x, y, b)=1 if (x R y) and b=1 or not(x R y) and b=0

$CNT_R(X, Y, B)(x, y, b)=0$ otherwise

The filtering method for the CNT constraints consists of the following rules (every applicable rule is applied):

[Variable, Demon=>Actions]

X, value(x)=>{
  If value(B)=1, remove from Dom(Y) every y such that not(x R y)
  If value(B)=0, remove from Dom(Y) every y such that x R y
  If for every y in Dom(Y), x R y holds, set the value of B to 1
  If for every y in Dom(Y), x R y does not hold, set the value of B to 0}

Y, value(y)=>{
  If value(B)=1, remove from Dom(X) every x such that not(x R y)
  If value(B)=0, remove from Dom(X) every x such that x R y
  If for every x in Dom(X), x R y holds, set the value of B to 1
  If for every x in Dom(X), x R y does not hold, set the value of B to 0}

B, value(b)=>{
  If b=1
  if value(X)=x, remove from Dom(Y) every y such that not(x R y)
  if value(Y)=y, remove from Dom(X) every x such that not(x R y)
  else (value(B)=0)
  if value(X)=x, remove from Dom(Y) every y such that x R y
  if value(Y)=y, remove from Dom(X) every x such that x R y}

Other demons do not trigger any action.

(b) Descriptor Constraints and Descriptor Variables

Given a constrained variable A and given a function f defined over Dom(A), the descriptor variable f(A) is defined by its domain:

Dom (f(A))=f(Dom(A))={f(a)|a in Dom(A)}

Given two constrained variables A and B, and given a function f defined over Dom(A) and taking values in Dom (B), we define the descriptor constraint $ATTR_f(A, B)$ by:

ATTR f(A, B)(a, b)=1 if b=f(a)

$ATTR_f(A, B)(a, b)=0$ otherwise

The filtering of descriptor constraints is the following:

[Variable, Demon=>Actions]

A, value(a)=>set the value of B to f(a)

B, value(b)=>remove every a from Dom(a) such that f(a)!=b

B, remove(b)=>remove every a from Dom(A) such that f(a)=b

Other demons (e.g., A, remove (a)) do not trigger any action.

(c) Similarity Constraints

Given two title variables A and B, and given a natural number N, the similarity constraint $S_N(A, B)$ between A and B is defined by:

S N(A, B)(a, b)=1 if |{i=1 . . . P|not(a.i~b.i)}|<=N

S N (A, B)(a, b)=0 otherwise

Which is equivalent to:

S N(A, B)(a,b)=1 if |{i=1 . . . P|a.i~b.i}|>=P−N $S_N(A, B)(a, b)=0$ otherwise

In these formulas, P represents the number of descriptors defined for a title, and "a.i" denotes the $i^{th}$ descriptor of title a.

To state a similarity constraint, we use descriptor variables (and descriptor constraints) to represent descriptor as constrained variables. We then define counting constraints to represent the number of similarities between descriptors of two titles as constrained variables. Then, we use a linear arithmetic constraint to limit the number of dissimilarities between two successive titles.

Technically, we define an additional descriptor variable for every descriptor of each title variable. Those descriptor variables are linked to the title variable they come from by an descriptor constraint. We then define a 0/1-variable for each descriptor variable. The 0/1-variable and the corresponding descriptor variable are linked together by a counting constraint. Optionally, we state a linear arithmetic constraint over the 0/1-variables which constrains the number of similarities between descriptors of the two title variables.

More precisely:

Let A and B be two title variables with P descriptors

Let N be a natural number (between 0 and P)

We state the similarity constraint $S_N(A, B)$ as follows:

For i=1 . . . P, we define Ai (resp. Bi) the descriptor variable of A (resp. B) corresponding to descriptor i; i.e. if style is the third descriptor, A3 is the variable whose domain is the set of styles of titles in the domain of A.

For i=1, . . . , P, we state a constraint ATTR(A, Ai) (resp. ATTR(B, Bi)) defined by ATTR(A, Ai)(a, b)=1 iff a.i=b (resp. ATTR(B, Bi)(a, b)=1 iff a.i=b)

For i=1, . . . , P, we define a 0/1-variable Ci

For i=1, ..., P, we state CNT_(Ai, Bi, Ci), the counting constraint for relation ~

We state a linear arithmetic constraint C1+ ... +CP>=P−N

A similarity constraint on two title variables is therefore defined by:

2.P descriptor variables (one for each title variable, and for each descriptor);

2.P descriptor constraints linking every descriptor variable with the corresponding title variable;

P 0/1-variables, one for each pair of descriptor variables corresponding to the same descriptor;

P counting constraints, linking each pair of descriptor variables with one 0/1-variable;

One linear arithmetic constraint over the 0/1-variables.

The filtering of similarity constraints is achieved by the filtering of the different descriptor and counting constraints defined . . . (properly speaking, the similarity constraint doesn't exist, it is a collection of additional variables linked together by descriptor and counting constraints)

(D). Applications of the Invention:

i) Sequences are generated by virtue of using the interface and algorithm described above.

ii) Iterative fixed-length sequences are generated, in which the user can iteratively apply the scheme to build sequences by refinement, e.g. by selecting, in a sequence computed by the system a title he/she does now want, and by relaunching the execution of the system.

The invention claimed is:

1. A method of generating sequencing information representing a sequence of items selected in a database, each of the items comprising a set of descriptors, said method comprising the steps of:

specifying a length of said sequence and at least one of said descriptors;

applying similarity relation techniques between said items of said sequence under construction, in which, for at least one item to appear in the sequence, wherein said item is chosen from said database on the basis of a similarity relation with a neighboring item of said sequence with which said chosen item shall be associated, so as to create a morphological continuity along said sequence, and said applying step comprises modeling each of said descriptors in a desired sequence as a constrained variable; and producing and storing in memory said associated items as at least part of said generated sequence, said sequence thereby having said morphological continuity.

2. The method according to claim 1, wherein each of said items is represented by a series of constraint variables having a domain in the database.

3. The method according to claim 1, wherein said similarity-relation applying step comprises applying a global similarity relation technique by combining individual similarity measures on all of said descriptors.

4. The method according to claim 1, wherein said similarity-relation applying step comprises providing mathematical similarity functions.

5. The method according to claim 1, wherein said similarity-relation applying step comprises providing similarity relations defined by given thresholds.

6. The method according to claim 1, wherein said descriptors are expressed in terms of descriptor/value pairs respectively, and each of said values for said descriptor is selected from descriptor/value lists.

7. The method according to claim 6, wherein each of said descriptors is associated to a descriptor type.

8. The method according to claim 7, wherein said descriptor type comprises at least one type selected from the group consisting of Integer-Type, Taxonomy-Type and Discrete-Type.

9. The method according to claim 1, wherein said step of specifying further comprises specifying a first title and a last title of said items in said sequence.

10. The method according to claim 1, wherein said step of specifying further comprises specifying a morphological style of said items in said sequence.

11. The method according to claim 1, wherein said database comprises musical pieces.

12. The method according to claim 1, wherein said descriptors comprise titles, and said titles form a music program.

13. The system adapted to implement the method of claim 1, comprising a general-purpose computer and a monitor for display of the generated information.

14. A computer program product adapted to carry out the method of claim 1, when loaded into a general purpose computer.

15. The method according to claim 1, wherein in step b, the similarity relation is applied to obtain two contiguous items of the sequence.

16. The method according to claim 1, wherein the items are music titles.

17. The method according to claim 1, wherein said morphological continuity is a morphing process along the items of said sequence.

18. A method of producing a sequence of items out of a database by specifying partial information, said method comprising the steps of:

introducing a global continuity constraint allowing to compute a morphing between items of said sequence;

taking as input partial information about arbitrary items in said sequence to be produced;

applying similarity relation techniques between said items of said sequence under construction, in which, for at least one item to appear in the sequence, wherein said item is chosen from said database on the basis of a similarity relation with a neighboring item of said sequence with which said chosen item shall be associated, so as to create a morphological continuity along said sequenced, and said applying step comprises modeling each of said descriptors in a desired sequence as a constrained variable; and producing and storing in memory the associated items as the sequence of items.

19. A system adapted to implement the method of claim 18, comprising a general-purpose computer and a monitor for display of the generated information.

20. The method according to claim 18, wherein the items are music titles.

21. The method according to claim 18, wherein said morphological continuity is a morphing process along the items of said sequence.

22. A method of generating sequencing information representing a sequence of items selected in a database, each of the items comprising a set of descriptors, said method comprising the steps of:

specifying a length of said sequence and at least one of said descriptors;

applying similarity relation techniques between said items of said sequence under construction, in which, for at least one item to appear in the sequence, said item is chosen from said database on the basis of a similarity relation with a neighboring item of said sequence with which said chosen item shall be associated, so as to create a morphological continuity along said sequence; and producing and storing in memory said associated items as at least part of said generated sequence, said sequence thereby having said morphological continuity, wherein said descriptors are expressed in terms of descriptor/value pairs respectively, and each of said values for each descriptor is selected from descriptor/value lists, and wherein said applying step comprises modeling each of said descriptors in a desired sequence as a constrained variable.

23. The method according to claim 22, wherein said morphological continuity is a morphing process along the items of said sequence.

24. The method according to claim 22, wherein said sequence-generating step comprises transforming said at least one of said values into unary constraints in terms of constraint satisfaction programming techniques.

25. The method according to claim 24, wherein said sequence-generating step further comprises subjecting said unary constraints to a processing of variables domain reduction.

26. An apparatus for generating sequencing information representing a sequence of items selected in a database, each of the items comprising a set of descriptors, said apparatus comprising:

specifying means for specifying a length of said sequence and at least one of said descriptors;

applying means for applying similarity relation techniques between said items of said sequence under construction, in which, for at least one item to appear in the sequence, said item is chosen from said database on the basis of a similarity relation with a neighboring item of said sequence with which said chosen item shall be associated, so as to create a morphological continuity along said sequence; and producing and storing means for producing and storing in memory said associated items as at least part of said generated sequence, said sequence thereby having said morphological continuity, and wherein said applying means models each of said descriptors in a desired sequence as a constrained variable.

27. The apparatus according to claim 26, wherein the items are music titles.

28. The apparatus according to claim 26, wherein said morphological continuity is a morphing process along the items of said sequence.

29. A method of generating sequencing information representing a sequence of items selected in a database, each of the items comprising a set of descriptors, said method comprising the steps of:

specifying at least a partial description of at least one said item to appear in said sequence;

applying similarity relation techniques between said items of said sequence under construction, in which, for at least one item to appear in the sequence, said item is chosen from said database on the basis of a similarity relation with a neighboring item of said sequence with which said chosen item shall be associated, so as to create a morphological continuity along said sequence; and producing and storing in memory said associated items as at least part of said generated sequence, said sequence thereby having said morphological continuity, and wherein said applying step comprises modeling each of said descriptors in a desired sequence as a constrained variable.

30. The method according to claim 29, wherein the items are music titles.

31. An apparatus for generating sequencing information representing a sequence of items selected in a database, each of the items comprising a set of descriptors, said apparatus comprising:

specifying means for specifying at least a partial description of at least one said item to appear in said sequence;

a processor for applying similarity relation techniques between said items of said sequence under construction, in which, for at least one item to appear in the sequence, said item is chosen from said database on the basis of a similarity relation with a neighboring item of said sequence with which said chosen item shall be associated, so as to create a morphological continuity along said sequence; and producing means for producing said associated items as at least part of said generated sequence, said sequence thereby having said morphological continuity, and wherein said processor is configured to model each of said descriptors in a desired sequence as a constrained variable.

32. The apparatus according to claim 31, wherein the items are music titles.

33. A method of generating sequencing information representing a sequence of music titles selected in a database, each of the music titles comprising a set of descriptors, said method comprising the steps of:

specifying a length of said sequence and at least one of said descriptors;

applying similarity relation techniques between said music titles of said sequence under construction, in which, for at least one music title to appear in the sequence, said music title is chosen from said database on the basis of a similarity relation with a neighboring music title of said sequence with which said chosen music title shall be associated, so as to create a morphological continuity along said sequence; and producing and storing in memory said associated music titles as at least part of said generated sequence, said sequence thereby having said morphological continuity, and wherein said applying step comprises modeling each of said descriptors in a desired sequence as a constrained variable.

34. An apparatus for generating sequencing information representing a sequence of music titles selected in a database, each of the music titles comprising a set of descriptors, said apparatus comprising:

specifying means for specifying a length of said sequence and at least one of said descriptors;

a processor for applying similarity relation techniques between said music titles of said sequence under construction, in which, for at least one music title to appear in the sequence, said music title is chosen from said database on the basis of a similarity relation with a neighboring music title of said sequence with which said chosen music title shall be associated, so as to create a morphological continuity along said sequence; and producing and storing means for producing and storing in memory said associated music titles as at least part of said generated sequence, said sequence thereby having said morphological continuity, and wherein said processor is configured to model each of said descriptors in a desired sequence as a constrained variable.

35. A method of generating sequencing information representing a sequence of items selected in a database, each of the items comprising a set of descriptors, said method comprising the steps of:

specifying a length of said sequence and at least one of said descriptors;

applying similarity relation techniques between said items of said sequence under construction, in which, for at least one item to appear in the sequence, said item is chosen from said database on the basis of a similarity relation with a neighboring item of said sequence with which said chosen item shall be associated, so as to create a morphological continuity along said sequence, and, on the basis of properties of dissimilarities, so as to create a variation along said sequence; and producing and storing in memory said associated items as at least part of said generated sequence, said sequence thereby having said morphological continuity, and wherein said applying step comprises modeling each of said descriptors in a desired sequence as a constrained variable.

* * * * *